(12) United States Patent
Degarie

(10) Patent No.: US 7,309,431 B2
(45) Date of Patent: Dec. 18, 2007

(54) METHOD FOR BREAKING A FLAP-VALVE ATTACHMENT CONDITION UNDER A MEMBRANE COVER

(76) Inventor: Claude J. Degarie, 1133 Regent St., Suite 300, Fredericton, New Brunswick (CA) E3B 3Z2

( * ) Notice: Subject to any disclaimer, the term of this patent is extended or adjusted under 35 U.S.C. 154(b) by 489 days.

(21) Appl. No.: 11/105,472

(22) Filed: Apr. 14, 2005

(65) Prior Publication Data

US 2005/0242023 A1 Nov. 3, 2005

Related U.S. Application Data

(60) Provisional application No. 60/566,403, filed on Apr. 30, 2004.

(51) Int. Cl.
*B65D 88/34* (2006.01)
*C02F 3/28* (2006.01)
(52) U.S. Cl. .................................. 210/603; 405/129.9
(58) Field of Classification Search ................ 210/603, 210/170.01, 170.08; 405/129.9
See application file for complete search history.

(56) References Cited

U.S. PATENT DOCUMENTS

| | | |
|---|---|---|
| 3,889,303 A | 6/1975 | Kinzel |
| 3,927,427 A | 12/1975 | Aine |
| 3,980,199 A | 9/1976 | Kays |
| 3,991,900 A | 11/1976 | Burke et al. |
| 4,139,117 A | 2/1979 | Dial |
| 4,208,469 A | 6/1980 | Dial |
| 4,230,580 A | 10/1980 | Dodson |
| 4,446,983 A | 5/1984 | Gerber |
| 4,476,992 A | 10/1984 | Gerber |
| 4,503,988 A | 3/1985 | Gerber |
| 4,603,790 A | 8/1986 | Gerber |
| 4,672,691 A | 6/1987 | DeGarie |
| 5,080,786 A | 1/1992 | De Lima |
| 5,206,067 A * | 4/1993 | Bonzo ........................ 428/119 |
| 5,505,848 A | 4/1996 | Landine et al. |
| 5,587,080 A | 12/1996 | Landine et al. |
| 6,338,169 B1 | 1/2002 | DeGarie |
| 6,357,964 B1 | 3/2002 | DeGarie |
| 6,361,249 B1 | 3/2002 | Hodgkinson |
| 6,497,533 B2 | 12/2002 | DeGarie |

FOREIGN PATENT DOCUMENTS

| | | | |
|---|---|---|---|
| CA | 1079925 | | 6/1980 |
| CA | 2379590 | | 8/2003 |
| FR | 2530486 | * | 1/1984 |
| WO | WO 91/13012 | | 9/1991 |

* cited by examiner

*Primary Examiner*—Fred G. Prince
(74) *Attorney, Agent, or Firm*—Mario Theriault

(57) ABSTRACT

In a covered wastewater reservoir, a gas passage is defined under the membrane cover and along the sides of the reservoir. An accumulation of bio-gases is held captive between the membrane cover and the liquid surface in a central region of the reservoir relative to the gas passage, by a flap-valve attachment condition extending between the accumulation of bio-gases and the gas passage. The new method for breaking this flap-valve attachment condition and for allowing bio-gases to flow from the accumulation of bio-gases toward the gas passage, consists of periodically and momentarily increasing a pressure in the gas passage to equal or to slightly exceed a pressure in the accumulation of bio-gases. In another aspect, the membrane cover is provided with a stiff and rough-surfaced bottom layer to facilitate the breaking of flap-valve attachment conditions when the pressure under the cover is made equal everywhere.

20 Claims, 4 Drawing Sheets

METHOD FOR BREAKING A FLAP-VALVE ATTACHMENT CONDITION UNDER A MEMBRANE COVER

FIELD OF THE INVENTION

This invention pertains to the maintenance of floating membrane covers on large industrial, municipal and agricultural reservoirs, and more particularly it pertains to a method to reduce the formation of gas pockets under a floating membrane cover.

BACKGROUND OF THE INVENTION

Floating membrane covers are mounted over settling ponds and clarifiers to contain and collect fermentation gases of mill effluents for example, and in many cases, to prevent the accumulation of rainwater inside these reservoirs. The maintenance of a membrane cover floating on a large wastewater reservoir represents certain difficulties in that the cover is exposed to the elements, and especially to wind uplift and wind-induced fluttering.

The fermentation of wastewater in a covered reservoir generates bio-gases that tend to create gas pockets under the cover. Following a rainfall, rainwater accumulates around the gas bubbles, thereby creating puddles, mounds and relaxed segments at random locations on the cover. These puddles and mounds catch the wind, creating uplifting forces on the cover. The relaxed segments also catch the wind and can even flutter in the wind. Such uplifting forces and fluttering movements promote the formation of waves along the cover and into the liquid under the cover.

The wind-induced forces and the movement of liquid under the cover causes tangential stresses and constant movement of the membrane itself. These movements and stresses can cause fatigue, localized elongation and can eventually rupture the membrane.

These inconveniences with floating membrane covers have been addressed in the past in different ways by different inventors. The following examples of floating membrane covers for covering large liquid reservoirs provide a good inventory of the prior art solutions to deal with wind forces on a membrane cover. In the following examples, weight lines, floating ridges and drains were used to reduce the formation of water puddles over the cover and gas pockets under the cover.

Examples of membrane covers mounted over industrial, municipal or agricultural reservoirs are disclosed in the following documents:

U.S. Pat. No. 3,980,199 issued to W. B. Kays on Sep. 14, 1976;
U.S. Pat. No. 3,991,900 issued to N. R. Burke et al. on Nov. 16, 1976;
U.S. Pat. No. 4,446,983 issued to D. H. Gerber on May 8, 1984;
U.S. Pat. No. 4,476,992 issued to D. H. Gerber on Oct. 16, 1984;
U.S. Pat. No. 4,503,988 issued to D. H. Gerber on Mar. 12, 1985;
U.S. Pat. No. 4,603,790 issued to D. H. Gerber on Aug. 5, 1986;
U.S. Pat. No. 4,672,691 issued to C. J. DeGarie et al. on Jun. 16, 1987;
U.S. Pat. No. 5,505,848 issued to R. Landine et al. on Apr. 9, 1996;
U.S. Pat. No. 5,587,080 issued to R. Landine et al. on Dec. 24, 1996;
U.S. Pat. No. 6,338,169 issued to C. J. DeGarie on Jan. 15, 2002;
U.S. Pat. No. 6,357,964 issued to C. J. DeGarie on Mar. 19, 2002;
U.S. Pat. No. 6,497,533 issued to C. J. DeGarie et al. on Dec. 24, 2002.

In another perspective, the following document discloses a membrane cover that can be inflated over its entire surface, or inflated along peripheral segments only, to remove wrinkles therein.

Accordingly, U.S. Pat. No. 4,139,117 issued to H.S. Dial, on Feb. 13, 1979, discloses a membrane cover mounted over a liquid storage reservoir. The cover is inflated by blowing air there under to remove wrinkles therein and to facilitate the flow of rain and water from melting snow off the membrane toward an appropriate drain. Alternatively, separate envelopes along the perimeter of the cover can be inflated separately to provide lateral tensioning of the membrane to eliminate the formation of wrinkles in the membrane.

In yet another application, U.S. Pat. No. 6,361,249 issued to D. G. Hodgkinson et al. on Mar. 26, 2002, discloses a negative air pressure cover for reducing the odours from a lagoon, a manure storage basin, waste water pond and other reservoirs of the like. This installation comprises a perforated pipe laid under a resilient membrane cover, along the perimeter of the cover. A pumping device is connected to the pipe for extracting air from under the cover through the pipe. The membrane cover in thereby held down by negative air pressure.

Similarly, when bio-gases are generated inside a covered reservoir, it is a common practice to withdraw these gases for treatment, and when methane gas is included, for burning these gases. In a gas-withdrawal installation, the bio-gases are drawn by a vacuum pump connected to a conduit communicating with the perimeter of the reservoir.

In that regard, another relevant installation was found in the prior art. This example pertains to a membrane cover that is inflated above the liquid surface of the reservoir and that is used as a gas storage for supplying combustible gases to a gas burning installation. Accordingly, CA Patent Application 2,379,590 filed by C. J. DeGarie et al. on Mar. 28, 2002, discloses an inflatable membrane cover mounted over a wastewater reservoir. The cover is used as a gas storage for accumulating the bio-gases being generated inside the reservoir. An anemometer and a pump are used to control the inflation of the cover according to the wind speed above the cover. Under high wind conditions, the cover is deflated to reduce the probability of the cover being damaged by wind induced stresses.

Although much effort have been made in the past to eliminate puddles and mounds on a membrane cover, the problem has never been solved entirely. FIGS. 1, 2 and 3 of the accompanying drawings have been prepared to illustrate a common problem with gas pockets being formed under a membrane cover. It has been found that when a vacuum pumping system (not shown) is connected to a gas outlet pipe 20 and is used to withdraw bio-gases from under a floating membrane cover 22, water puddles 24 tend to form on the,cover along the walls of the reservoir, as represented by a rectangular configuration 26 in FIG. 1 of the attached drawings. The presence of weight lines and a drain does not seem to prevent the accumulation of rainwater puddles 24 along this rectangular configuration 26. Eventually, these water puddles expand and connect with each other along the rectangular configuration 26, thereby sinking the cover near the walls of the reservoir, and blocking the migration of bio-gases from a central region of the reservoir to the gas outlet pipe 20. It has been found that an increase in negative pressure in the gas outlet pipe 20 causes the regions of adherence to expand.

Consequently, it is still a common practice for maintenance workers to use brooms and squeegees to push this water toward the drains. Such walking activities on a membrane cover wears the membrane material and reduces the life of the cover.

In a wastewater reservoir 30, as shown in a simplified manner in FIG. 1, the reservoir is covered by a flexible floating membrane 22. The bio-gases generated from the fermentation of the wastewater inside the reservoir migrates under the cover to the perimeter of the reservoir, as can be understood from FIG. 2, where it is drawn out by a vacuum pump (not shown) communicating with the gas outlet pipe 20. Weight lines 32 are normally laid on the membrane cover to keep the membrane taut and to promote the migration of bio-gases toward the perimeter of the cover. One or more drains 34 are also installed in the cover to evacuate rainwater.

It has been observed that when water accumulates in a random manner on a membrane cover, the combination of the vacuum under the cover along the perimeter of the reservoir and the water puddles cause the membrane to adhere to the surface of the liquid inside the reservoir near the sides of the reservoir. The vacuum under the cover, the water puddles and atmospheric pressure on the cover causes patches and strips of the membrane to adhere, such as a flap valve, to the liquid surface near the walls of the reservoir. These adhered patches and strips retain the membrane to the liquid surface of the reservoir and form basins along the walls of the reservoir to further retain rainwater along the walls of the reservoir. As more water accumulate on the cover, or when more vacuum is applied under the cover, more patches adhere to the liquid surface, thereby promoting the formation of gas pockets in a central area of the reservoir. The gas pockets in a central area of the reservoir push rainwater toward the sides of the reservoir, causing more or longer patches and strips of membrane to adhere to the liquid surface of the reservoir.

The root cause of this phenomenon is referred to herein as a flap-valve attachment phenomenon or a flap-valve attachment condition.

Referring now to FIG. 3, a flap-valve attachment phenomenon will be described as it is best understood. Generally, the vacuum pump is set to create a negative pressure in the bio-gas outlet pipe 20 and in the gas passage 36 around the perimeter of the reservoir 30. It has been found that this negative pressure causes the liquid level 38 in the gas passage 36 to rise slightly above the liquid level 40 at the center of the reservoir. This difference in elevation is shown in an exaggerated manner as ΔH in FIG. 3. This difference in elevation ΔH causes a region of adherence of the membrane over a distance 'A', which corresponds to the cotangent of the angle of contact of the membrane 22 against the surface of the wastewater, multiplied by ΔH.

This region of adherence 'A' is fixed relative to the wall of the reservoir 30, and its position and width depend on the tension in the membrane, the level of wastewater in the reservoir and the negative pressure in the gas passage 36.

This region of adherence 'A', and more particularly the atmospheric pressure 42 in that region 'A' causes a flap-valve attachment condition, which blocks the migration of bio-gases toward the gas passage 36 along the perimeter of the reservoir. Any increase in negative pressure P1 in the gas passage 36 worsens this flap-valve attachment condition.

Any increase in the positive bio-gas pressure P2 in a gas pocket also worsens this condition.

As the bio-gases accumulate at the center of the reservoir, the rainwater 24 on the surface of the cover tends to accumulate along the rectangular region of adherence 26 as illustrated in FIG. 1. This accumulation of rainwater 24 away from the drain 34, increases the tension in the membrane 22 along the edges of the reservoir 30, and reduces the life of the membrane cover.

As it is best understood, these flap-valve attachment conditions are also initiated by the surface tension in the liquid inside the reservoir, and by a capillary effect between the liquid surface and the membrane material.

Accordingly, there remains a need in the industry for a better solution to reduce the formation of gas pockets under a membrane cover.

SUMMARY OF THE INVENTION

In the present invention there is provided a new method for breaking flap-valve attachment conditions in a membrane cover. There is also provide a method and a membrane structure to reduce the effects of flap-valve attachment conditions in a covered reservoir, and by the same action to reduce the formation of gas pockets under a membrane cover.

In a first aspect of the present invention, there is provided a method for breaking a flap-valve attachment condition retaining a portion of a membrane cover to the liquid surface of a wastewater reservoir. In this reservoir, a gas passage is defined under the membrane cover and along the sides of the reservoir. An accumulation of bio-gases is held captive between the membrane cover and the liquid surface in a central region of the reservoir relative to the gas passage, by a flap-valve attachment condition extending between the accumulation of bio-gases and the gas passage.

The method according to the present invention comprises the step of periodically and momentarily increasing a pressure in the gas passage under the membrane cover to equal or to slightly exceed a pressure in the accumulation of bio-gases.

This method causes the width of a region of adherence between the membrane cover and the liquid surface to be reduced to zero, thereby breaking the flap-valve attachment condition and allowing the accumulation of bio-gases to flow into or to slowly migrate toward the gas passage.

In another aspect of the present invention, there is provided a method for more easily breaking flap-valve attachment conditions. This method comprises the steps of; making equal the pressure in the gas passage and the pressure under the cover in the central region of the reservoir, and providing a membrane cover that has a turbulence-inducing surface thereon in contact with the liquid surface of the reservoir. Such turbulence-inducing surface has the ability to break the surface tension in the liquid inside the reservoir, and to reduce the capillary effect between the membrane cover and the liquid surface inside the reservoir. Because of these reductions in adhesion forces between the membrane cover and the liquid surface, the flap-valve attachment conditions present under the membrane cover are more easily broken when the pressure under the cover is made equal everywhere.

In yet another aspect of the present invention, the membrane cover is provided with a stiff layer therein to prevent the membrane from flexing and following the curvatures of waves and ripples at the liquid surface under the cover. Because of this increase in stiffness, the flap-valve attachment conditions are still more easily broken when the pressure under the cover is made equal everywhere.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

Several drawings are included to illustrate a problem that is inherent in large floating membrane covers, so that one can obtain a better appreciation of the novelty and inventiveness of the method according to the present invention. The drawings also comprise illustrations to better explain the method according to the present invention and the preferred membrane structure. In these drawings, like numerals denote like parts throughout the several views. In the drawings.

DESCRIPTION OF THE PREFERRED EMBODIMENT

Figure 1:
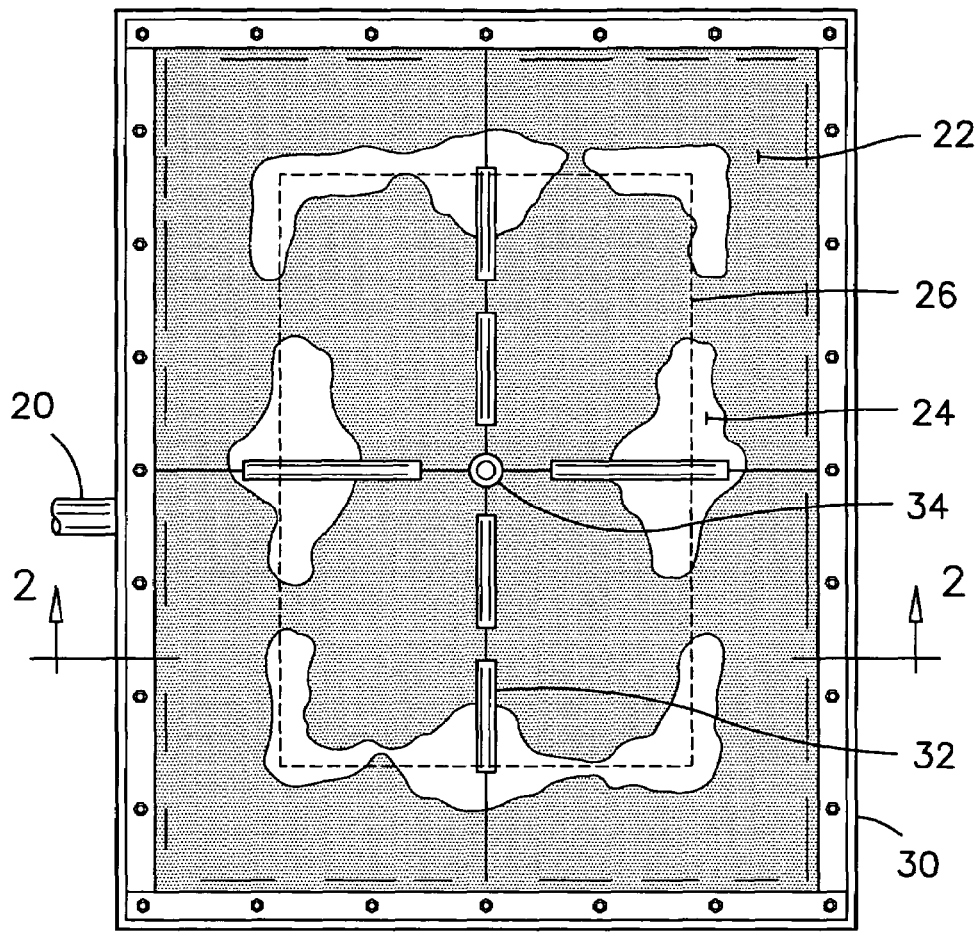
FIG. 1 is a simplified plan view of a reservoir having a membrane cover floating on it, with rainwater accumulations around the perimeter of the reservoir as it is often the case in such covered reservoirs.
Figure 2:
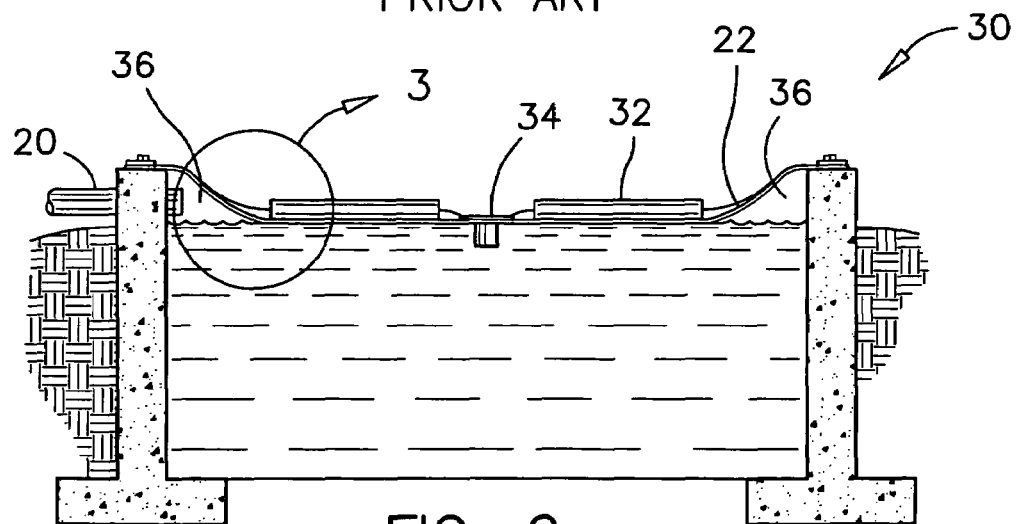
FIG. 2 is a cross-sectional elevation view of the reservoir illustrated in FIG. 1, as seen along line 2-2 in FIG. 1.

While this invention is susceptible of embodiments in many different forms, there is shown in the drawings and will be described in details herein one specific embodiment of a method for breaking a flap-valve attachment phenomenon, with the understanding that the present disclosure is to be considered as an example of the principles of the invention and is not intended to limit the invention to the embodiment illustrated and described.

There are two facets to the method according to the preferred embodiment of the present invention. A first step in this method consists of equalizing the pressure under the membrane cover, and the other step consists of providing a stiff and rough-surfaced membrane. It has been found that a stiff and rough-surfaced membrane reduces the capillary effect between the membrane surface and the liquid surface inside the reservoir, and therefore facilitate the breaking of a flap-valve attachment condition.

While the first step is sufficient to break a flap-valve attachment condition in many applications, both steps are preferred to increase membrane life in large industrial and municipal wastewater reservoirs and in agricultural manure reservoirs.

For convenience, the two steps of the preferred method are described separately herein below.

A) Pressure Equalization Method

Figure 3:
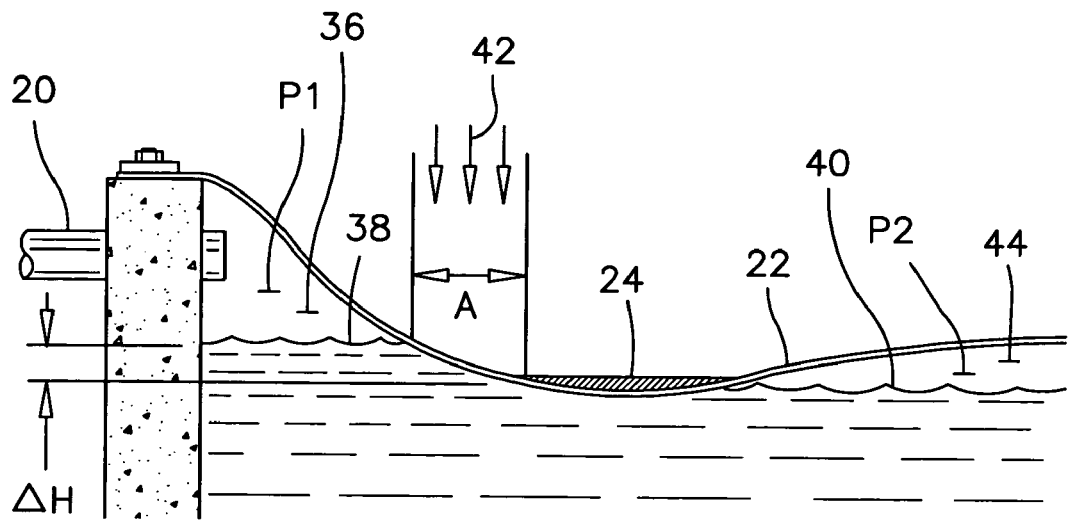
FIG. 3 is an enlarged cross-sectional view of the detail circle 3 in FIG. 2, to illustrate a flap-valve attachment phenomenon, as it is best understood.
Figure 4:
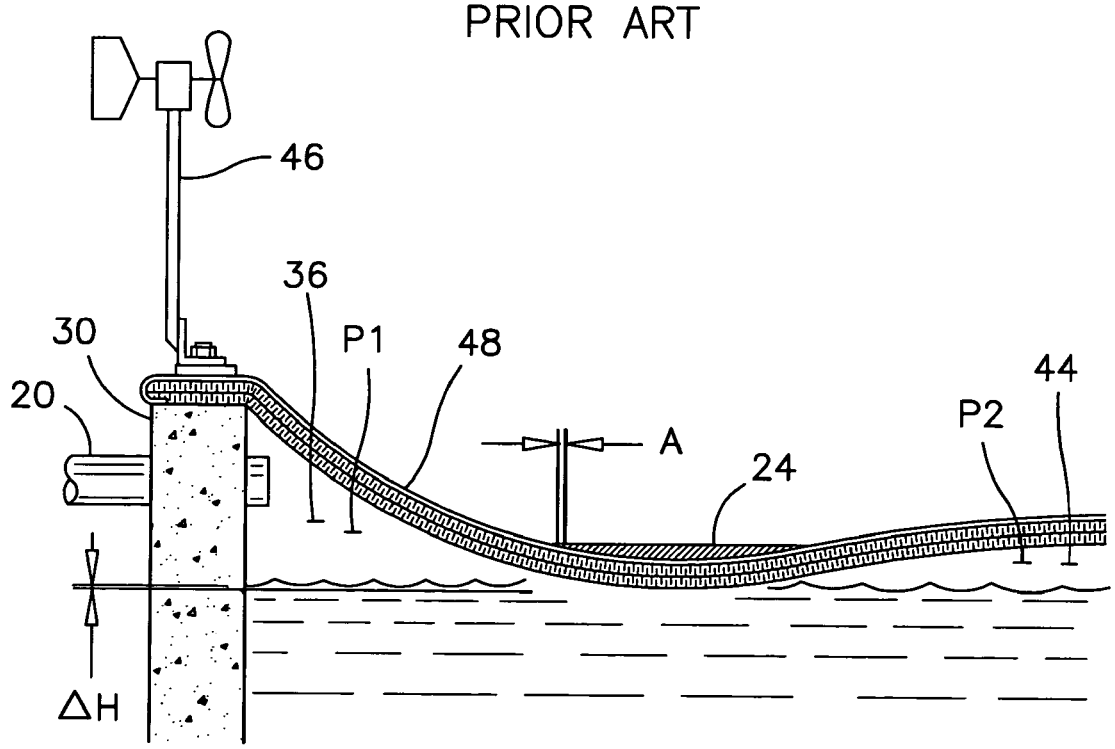
FIG. 4 is a variation of the view in FIG. 3, graphically explaining a first step in the method according to the present invention to break a flap-valve attachment condition.

Referring again to FIG. 3 while looking at FIG. 4, the pressure equalization method according to the present invention consists of periodically and momentarily relaxing the negative pressure in the gas passage 36, to allow the pressure P1 in the gas passage 36 along the perimeter of the reservoir 30 to equal or to slightly exceed the pressure P2 in a gas pocket under the central region 44 of the cover. It will be appreciated that the gas passage 36 extends along the entire perimeter of the reservoir. The central region 44 of the reservoir makes reference to any portion of the reservoir excluding the gas passage 36.

This reduction in negative pressure in the gas passage 36 causes the liquid head in the gas passage 36 to be equal or to be slightly less that a liquid head in a central region 44 of the reservoir. In other words, the reduction in negative pressure P1 causes ΔH to become nil, thereby reducing the region of adherence 'A' to a nil width, as illustrated in FIG. 4.

Figure 5:
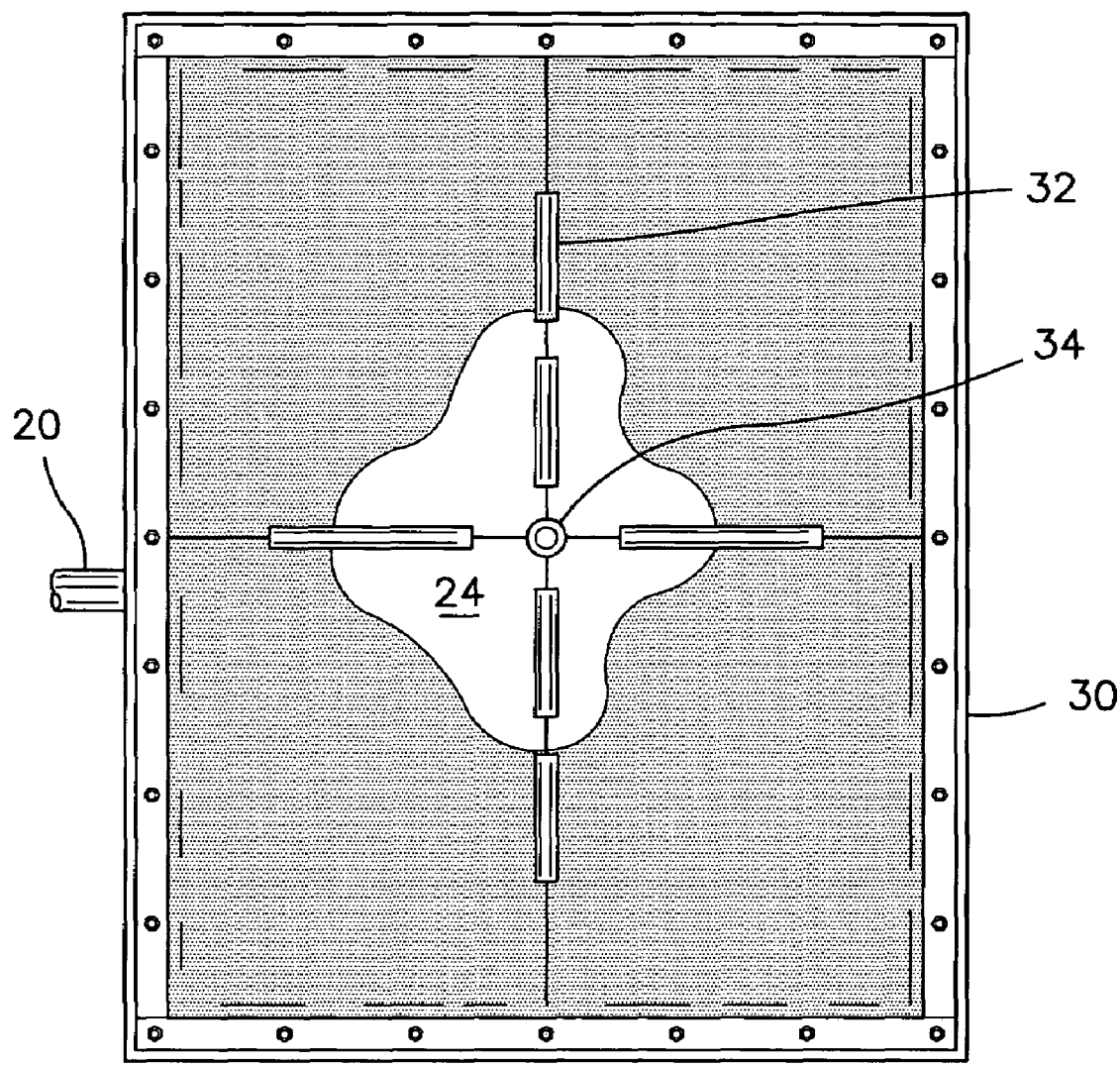
FIG. 5 illustrates a plan view of the reservoir in FIG. 1, with a rainwater accumulation at the central region of the reservoir, after the pressure equalization method according to the present invention has been applied to the membrane cover and reservoir.

Then, the membrane cover 22 can recover its normal sag, whereby the accumulation of bio-gas at the center 44 of the reservoir can migrate toward the gas passage 36 under the action of the weight lines 32. As the gas pockets at the center 44 of the reservoir are deflated, rainwater 24 on the entire surface of the cover can flow toward the drain 34, as illustrated in FIG. 5.

It will be appreciated that while a relaxation of the vacuum pressure P1 has been mentioned, an increase of pressure P1 in excess of P2, using a gas blower for example, can also be used to overcome a flap-valve attachment condition at the region 'A'. In some cases, such a slight increase in positive pressure P1 is even recommended.

This relaxation of vacuum or increase in pressure P1 in the gas passage 36 is preferably effected when the wind speed above the reservoir is minimal or nil. For that purpose, an anemometer 46 is preferably installed near the reservoir 30 to monitor wind speed, as illustrated in FIG. 4. Also for that purpose, a control system (not shown) is installed in the vacuum pump compartment for example, to vary the speed or flow of the vacuum pump and/or a blower if required, according to wind speed. For example, the speed or flow of the vacuum pump is reduced when the wind weakens, and the vacuum pump is stopped or reversed when the wind dies down.

The increase in pressure P1 in the gas passage 36 is preferably effected for a short period of time, say one or few hours for example, and then reduced to a negative pressure again for several hours at the time. The variation of pressure should be done repeatedly every day or once every several days, according to the production of bio-gases inside the reservoir.

B) Stiffening and Surface-Conditioning of the Membrane Cover

It also has been found that an increase in stiffness and roughness in the membrane cover 48, substantially facilitates the breaking of flap-valve attachment conditions. As it is best understood, a stiffened and rough-surfaced membrane has a reduced adhesion coefficient with the liquid surface. It is believed that the capillary effect of wastewater against the membrane material is somewhat proportional to the smoothness of the membrane surface and to the ability of the membrane to flex and to follow the dips and curvatures of the waves and ripples at the surface of the liquid inside the reservoir. It is also believed that these capillary forces are more easily broken on a stiff and rough surface, by the movement of these waves and ripples relative to the membrane, as soon as an equalization of pressure under the cover is effected.

Figure 6:
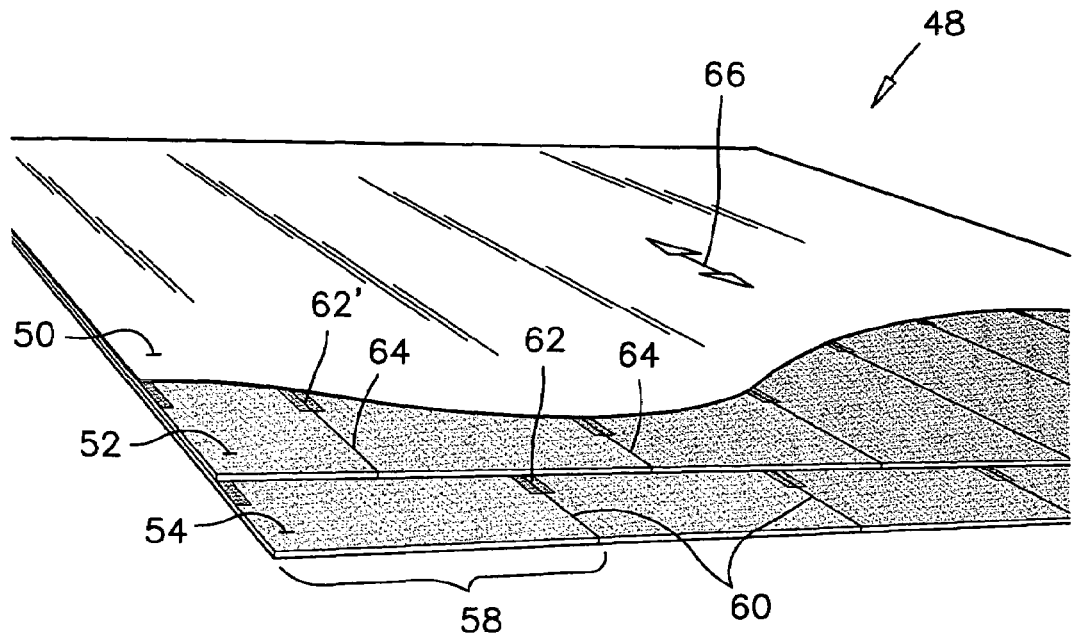
FIG. 6 illustrates a perspective view of a preferred membrane structure which is preferably used in combination with the pressure equalization method according to the present invention.

Therefore, in a preferred installation to increase the life of a membrane cover, the membrane itself preferably has three layers wherein at least two layers are made of semi-rigid foam insulation. These two layers are bonded together and to a water and gas-impermeable top layer 50, as illustrated in FIG. 6. One of the foam layers constitutes a bottom layer in contact with the liquid surface. The top layer 50 is preferably made of a stretch-resistant nylon-based or polyethylene-based pliable sheet material. Each foam layer 52, 54 is preferably made of semi-rigid, closed-cell, water-impermeable insulating foam such as polyethylene foam for example. Each foam layer 52, 54 preferably has a thickness of about one-half inch. The resultant stiffness of the preferred membrane cover, obtained by such thickness, is advantageous for considerably reducing the occurrence of flap-valve attachment conditions in a majority of common-size reservoirs.

The surface of such foam material is made of small lumps and cavities 56, that have the ability to break surface tension at the surface of the liquid inside the reservoir. Moreover, such polyethylene foam material is known to repel water. It is believed that the irregular and water-repelling surface of such semi-rigid foam material has the ability to cause a turbulent flow under the membrane cover when there is a slight relative movement, between the liquid surface inside the reservoir and the surface of the membrane cover.

While it is difficult to determine precisely the surface-roughness factor and other surface properties of such foam material, it is defined herein as a turbulence-inducing surface 56. It is believed that any non-smooth surface capable of creating to a certain extent a non-laminar flow in the waves and ripples under the membrane cover, can be used to facilitate the breaking of a flap-valve attachment condition.

The intermediate and bottom layers 52, 54 of foam insulation are made of juxtaposed strips 58 each having and a width of about four to ten feet. The strips 58 in the intermediate layer 52 are laid astride the joints 60 in the bottom layer 54. The adjacent edges in each joint 60 in the bottom layer 54 are bonded to the underside surface of the intermediate layer 52 by hot-melt welds 62. Similarly, the adjacent edges in each joint 64 in the intermediate layer 52 are bonded to the underside of the top layer 50 using hot-melt welds 62'.

In the membrane cover illustrated in FIG. 6, the double-headed arrow 66 represents the width of the cover or the shortest distance to the sides of the reservoir. The joint lines 60 are preferably oriented in the direction that offers the shortest distance to the gas passages 36 around the reservoir. The welds 62 on the bottom layer 54 are continuous welds to seal the upper side of the joints 60 and to prevent the bio-gas from seeping between the foam layers 52, 54 and beneath the top layer 50.

Figure 7:
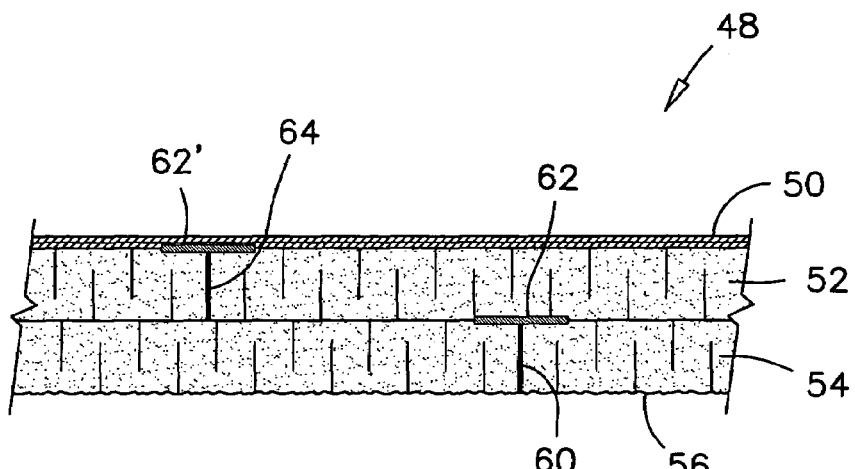
FIG. 7 is an enlarged, not-to-scale, cross-sectional view of the preferred membrane structure.

Although the joints 60 are illustrated in FIGS. 6 and 7 as a pair of closely spaced lines, in practice, a gap or an interstice having a sufficient width to form a gas passage is formed in every joint 60. It is believed that the vertically oriented joint lines 60 in the bottom foam layer 54 and sealing welds 62 constitute stiff gas passages that are substantially non-collapsible under atmospheric pressure 42.

It also has been observed, that because of the stiffness of the three-layer membrane 48, this membrane is less vulnerable to wind uplift than a single ply membrane. Yet another advantage of the stiff membrane 48 described above is that less weight lines 32 are required to push the bio-gases to the perimeter of the reservoir. Because the membrane is less vulnerable to wind uplift, the vacuum force to stabilize the membrane against wind uplift is only required to a lesser extent. Consequently, the lesser vacuum force causes less occurrences of flap-valve attachment conditions along the perimeter of the reservoir.

It will be appreciated that the pressure equalization method described herein can also be used with a single ply membrane cover, in specific installations. When the production of bio-gases in a reservoir is relatively high, however, the stiff membrane cover 48 should be used in combination with the pressure equalization method described hereinbefore to ensure a long life of the membrane.

Similarly, while two foam layers have been described herein in the preferred membrane cover 48, it will be appreciated that a single foam layer may be all that is required in a low-fermentation reservoir for example, and three or more layers may be required in very high-fermentation reservoirs.

While two aspects of the preferred embodiment of the present invention have been illustrated and described herein above, it will be appreciated by those skilled in the art that various modifications, alternate constructions and equivalents may be employed without departing from the true spirit and scope of the invention. Therefore, the above description and the illustrations should not be construed as limiting the scope of the invention which is defined by the appended claims.

What is claimed is:

1. A method for breaking a flap-valve attachment condition in a wastewater reservoir having; a floating membrane cover laid over a liquid surface thereof, a gas passage along a perimeter thereof under said membrane cover, an accumulation of bio-gases under said membrane cover in a central region of said reservoir relative to said gas passage, and a flap-valve attachment condition between said gas passage and said accumulation of bio-gases blocking a migration of said bio-gases toward said gas passage; said method comprising the step of periodically and momentarily increasing a pressure inside said gas passage to equal a pressure in said accumulation of bio-gases.

2. The method as claimed in claim 1, wherein said step of periodically and momentarily increasing a pressure is carried out when wind speed above said reservoir is low.

3. The method as claimed in claim 1, further including the step of increasing a pressure inside said gas passage to exceed a pressure in said accumulation of bio-gases.

4. The method as claimed in claim 1, wherein said membrane cover has rainwater thereon near said perimeter, and further including the step of moving said rainwater from near said perimeter toward said central region of said reservoir.

5. A method for breaking a flap-valve attachment condition in a wastewater reservoir having; a floating membrane cover laid over a liquid surface thereof, a gas passage along a perimeter thereof under said membrane cover, an accumulation of bio-gases under said membrane cover in a central region of said reservoir relative to said gas passage, and a flap-valve attachment condition between said gas passage and said accumulation of bio-gases blocking a migration of said bio-gases toward said gas passage; said method comprising the steps of:

making equal a gas pressure in said gas passage and under said cover in said central region of said reservoir, and providing a membrane cover having a turbulence-inducing surface in contact with said liquid surface inside said reservoir.

6. The method as claimed in claim 5 further including the step of providing a stiffening layer in said membrane cover.

7. The method as claimed in claim 6 wherein said step of providing a stiffening layer comprises the step of providing a layer of semi-rigid foam insulation in said membrane cover.

8. The method as claimed in claim 5, wherein said step of providing a membrane cover includes the step of providing a membrane cover having a bottom layer, and vertically non-collapsible interstices in said bottom layer, extending between and communicating with said central region of said reservoir and said gas passage.

9. The method as claimed in claim 8, wherein said membrane cover further has a top layer and an intermediate layer, and said top layer is made of a stretch-resistant nylon-based pliable sheet material, and each of said intermediate and bottom layers is made of semi-rigid, closed-cell, water-impermeable insulating foam strips, and said interstices are formed between said strips.

10. The method as claimed in claim 9 wherein said foam strips have a thickness of about one-half inch.

11. The method as claimed in claim 9, wherein said foam strips in said intermediate layer are laid astride said interstices in said bottom layer.

12. The method as claimed in claim 11, wherein said bottom layer is bonded to said intermediate layer and said intermediate layer is bonded to said top layer, by hot-melt welds.

13. A method for reducing the effects of a flap-valve attachment condition in a wastewater reservoir having; a floating membrane cover laid over a liquid surface thereof, a gas passage along a perimeter thereof under said membrane cover, an accumulation of bio-gases under said membrane cover in a central region of said reservoir relative to said gas passage, and a flap-valve attachment condition between said gas passage and said accumulation of bio-gases blocking a migration of said bio-gases toward said gas passage; said method comprising the step of providing a membrane cover having a turbulence-inducing surface in contact with said liquid surface of said reservoir.

14. The method as claimed in claim 13, further including the step of momentarily increasing a pressure in said gas passage to equal or to exceed a pressure in said central region.

15. The method as claimed in claim 14, wherein said step of momentarily increasing a pressure is effected when wind speed above said reservoir is low.

16. The method as claimed in claim 14, wherein said step of providing a membrane cover comprises the step of providing a membrane cover having a bottom layer, and vertically non-collapsible interstices in said bottom layer, extending between and communicating with said central region of said reservoir and said gas passage.

17. The method as claimed in claim 16, wherein said step of providing a membrane cover comprises the step of providing a membrane cover having a top layer and an intermediate layer, and said top layer being made of a stretch-resistant nylon-based pliable sheet material, and each of said intermediate and bottom layers being made of semi-rigid, closed-cell, water-impermeable insulating foam strips and said interstices being formed between said foam strips.

18. The method as claimed in claim 17 wherein said step of providing a membrane cover comprises the step of providing a membrane cover wherein each of said foam strips has a thickness of about one-half inch.

19. The method as claimed in claim 18, wherein said step of providing a membrane cover comprises the step of providing a membrane cover having said interstices oriented along a shortest distance between said accumulation of bio-gases and said gas passage.

20. The method as claimed in claim 18, wherein said step of providing a membrane cover comprises the step of providing a membrane cover having said foam strips in said intermediate layer laid astride said interstices in said bottom layer.

* * * * *